No. 615,496. Patented Dec. 6, 1898.
F. H. RICHARDS.
WEIGHING MACHINE.
(Application filed Feb. 1, 1898.)
(No Model.) 7 Sheets—Sheet 1.

Fig. 1.

Witnesses:
G. B. Rowley
Fred. J. Dole

Inventor:
F. H. Richards

No. 615,496. Patented Dec. 6, 1898.
F. H. RICHARDS.
WEIGHING MACHINE.
(Application filed Feb. 1, 1898.)
(No Model.) 7 Sheets—Sheet 2.

Fig. 2.

Witnesses:
G. B. Rowley.
Fred. J. Dole.

Inventor:
F. H. Richards.

No. 615,496. Patented Dec. 6, 1898.
F. H. RICHARDS.
WEIGHING MACHINE.
(Application filed Feb. 1, 1898.)

(No Model.) 7 Sheets—Sheet 3.

Fig. 3.

Witnesses:
G. B. Rowley.
Fred. J. Dole.

Inventor:
F. H. Richards.

No. 615,496. Patented Dec. 6, 1898.
F. H. RICHARDS.
WEIGHING MACHINE.
(Application filed Feb. 1, 1898.)

(No Model.) 7 Sheets—Sheet 4.

Fig. 4.

Witnesses:
G. B. Rowley.
Fred. J. Dole.

Inventor:
F. H. Richards.

No. 615,496. Patented Dec. 6, 1898.
F. H. RICHARDS.
WEIGHING MACHINE.
(Application filed Feb. 1, 1898.)
(No Model.) 7 Sheets—Sheet 6.

Fig. 6.

Witnesses:
G. B. Rowley.
Fred. J. Dole.

Inventor:
F. H. Richards.

No. 615,496. Patented Dec. 6, 1898.
F. H. RICHARDS.
WEIGHING MACHINE.
(Application filed Feb. 1, 1898.)
(No Model.) 7 Sheets—Sheet 7.

Witnesses:
G. B. Rowley
Fred J. Dole

Inventor:
F. H. Richards

THE NORRIS PETERS CO., PHOTO-LITHO., WASHINGTON, D. C.

United States Patent Office.

FRANCIS H. RICHARDS, OF HARTFORD, CONNECTICUT.

WEIGHING-MACHINE.

SPECIFICATION forming part of Letters Patent No. 615,496, dated December 6, 1898.

Application filed February 1, 1898. Serial No. 668,723. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and more especially to an automatic machine of this class for weighing slow-running substances in large quantities; and the object of the invention is to provide means for positively operating certain of the parts and devices for insuring the action of the several mechanisms in regular order.

My improved machine involves the provision of stream-supplying means, such as a chute, a stream-controller, and power-driven mechanism adapted to be connected or coupled with the stream-controller and constructed and mounted to impart the reverse movements alternately to said stream-controller.

The power-driven mechanism consists, preferably, of a pair of oppositely-movable screws adapted to engage and thereby operate a member connected with the stream-controller, so as to move the latter back and forth either to cut off or permit the flow of the supply-stream into the load-receiver of the weighing mechanism.

The supply apparatus in the present case embodies two supply-spouts, one of which furnishes a main or large stream and the other a drip or reduced stream, and for controlling the flow of the main stream I prefer to employ a stream-controller in the nature of a carriage adapted to reciprocate bodily between two extreme positions upon a track or way and operated, preferably, by power-actuated mechanism supported independently of but controlled by the weighing mechanism.

The passage of the drip-stream is regulated by a feed device or conveyer driven, preferably, from the mechanism which actuates the stream-controller. The two streams flow simultaneously into the load-receiver until the latter is practically loaded, at which point the main stream is cut off by the closure of the stream-controller, after which the drip-stream is forced into the load-receiver by the feed device to complete the load, at which time said feed device is thrown out of action, thereby entirely to arrest the supply.

Another object of the invention is to provide, in combination with weighing mechanism and with load-discharge-controlling means involving a latch, a supply apparatus including a feeder, a shaft in two sections, one of which is adapted to operate the feeder, latch-tripping means actuated from the other shaft-section, a driver for said shaft-sections, and means for alternately coupling the driver with the two shaft-sections, whereby the feeder will be operated or the latch will be tripped in accordance with the shaft-section connected with the driver. The two sections of the shaft are mounted upon the framework, and each carries a clutch member, complemental clutch members being fixed to the opposite ends of a longitudinal spindle carrying a driver, such as a pulley, and by shifting the spindle the two members of the respective clutches are alternately connected. One shaft-section carries suitable feeder-operating mechanism, while between the other shaft-section and a latch-tripper instrumentalities of a suitable nature are located for actuating the latch-tripper, whereby when the latch-tripping shaft-section is operated the discharge of the load will promptly follow.

My improved machine also includes interlocking or safety stops between certain of its parts for insuring the operation of such parts in predetermined order.

In the drawings accompanying and forming part of this specification.

A suitable framework for supporting the different parts of the machine consists of the chambered base 2, the side frames 3 and 4, the brackets 5 and 6, extending oppositely from the supply hopper or chute H and mounted upon the side frames, the horizontally-disposed beam 7, secured to the bracket 5, and the upright or standard 8, fixed to the base and sustaining the back end of the beam 7, the latter being intended to carry certain of the feeder and other operating mechanisms.

The weighing mechanism is preferably of the kind disclosed in Letters Patent No. 548,840, granted to me October 29, 1895, to which reference may be had, and it consists of a load-receiver, as G, and supporting-beams, as B and B', respectively mounted upon the framework and supporting the load-receiver in the manner shown in the patent aforesaid, and the counterweights of the two beams are designated by W and W', and each consists of a longitudinal weight joining the two arms 9 and 10, respectively, of the said beams.

Figure 13:
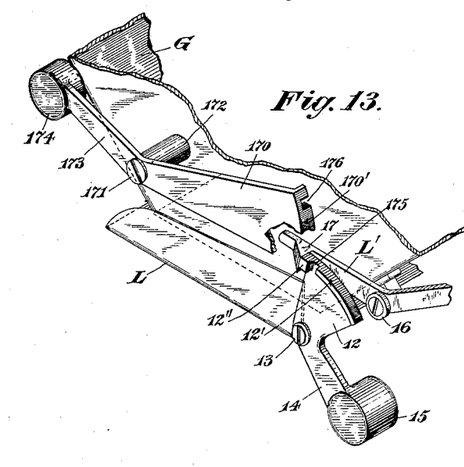
Fig. 13 is an enlarged perspective of said stop mechanism.

The load-discharge-controlling means involves in the present instance a closer L (see Fig. 13) and a latch L', adapted to engage a suitable member, as the segment 12, operative with the closer to hold the latter shut, and the closer L consists, preferably, of a flat plate adapted normally to cover the discharge-outlet of the load-receiver and having suitable openings in the opposing rear sides to receive pivots, as 13, adapted to work in bearings, as 13', on the load-receiver, the segmental plate 12 being secured to one of the pivots, as indicated in Fig. 13, and having an arm 14, provided with a weight 15, adapted to shut the closer on the complete discharge of the load. The latch L' is pivoted, as at 16, to a hub on the load-receiver, and its forward arm has a hook 17, adapted to engage the upper forward side of the segment 12 for holding the closer shut.

The supply apparatus involves in its organization a supply-chute, as H, for delivering a series of streams to the load-receiver G and suitable stream-controlling mechanism coöperative with the chute.

The chute or hopper H is provided with a main spout, as 20, and a drip-spout, as 21, communicating with and depending vertically from the main spout, said spouts serving to supply streams of different sizes to the load-receiver, and both of the streams flowing simultaneously into the load-receiver up to the commencement of the poising period, at which time the main stream is cut off, the drip-stream, however, being fed into the load-receiver to complete the partial load.

The main stream is governed by the stream-controller S, while the passage of the drip-stream is regulated by a force-feeder, as F, hereinafter more particularly described.

Figure 1:
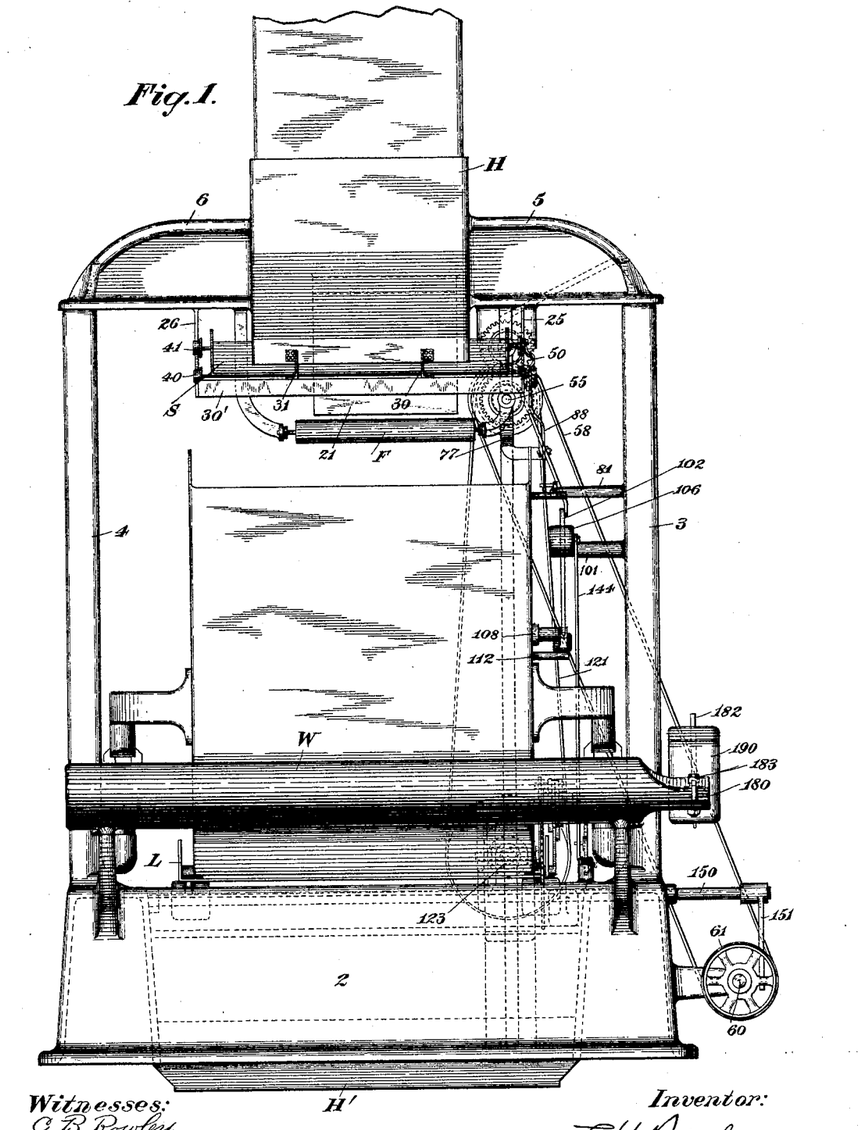
Figure 1 is a front elevation of my improved weighing-machine.
Figure 2:
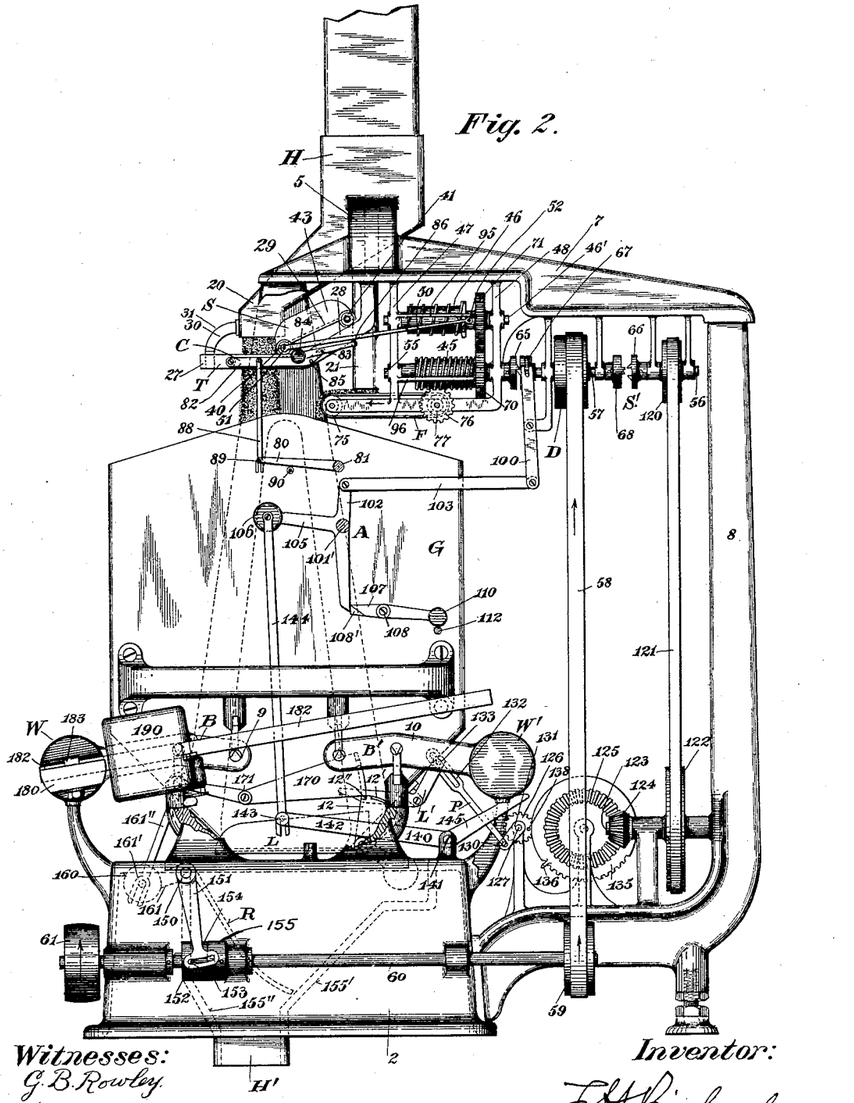
Figs. 2, 3, 4, and 5 are side elevations of the machine as seen from the right in Fig. 1 and show the positions occupied by the different parts during the making and discharging of a load.
Figure 5:
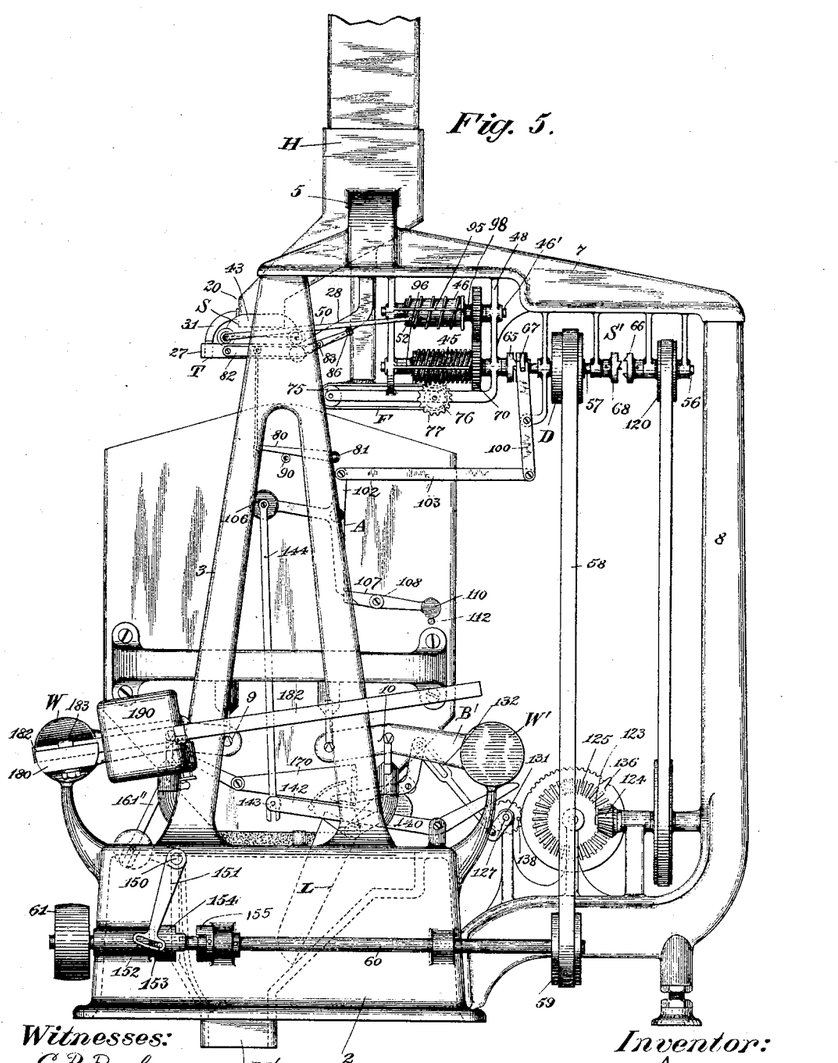
Figure 6:
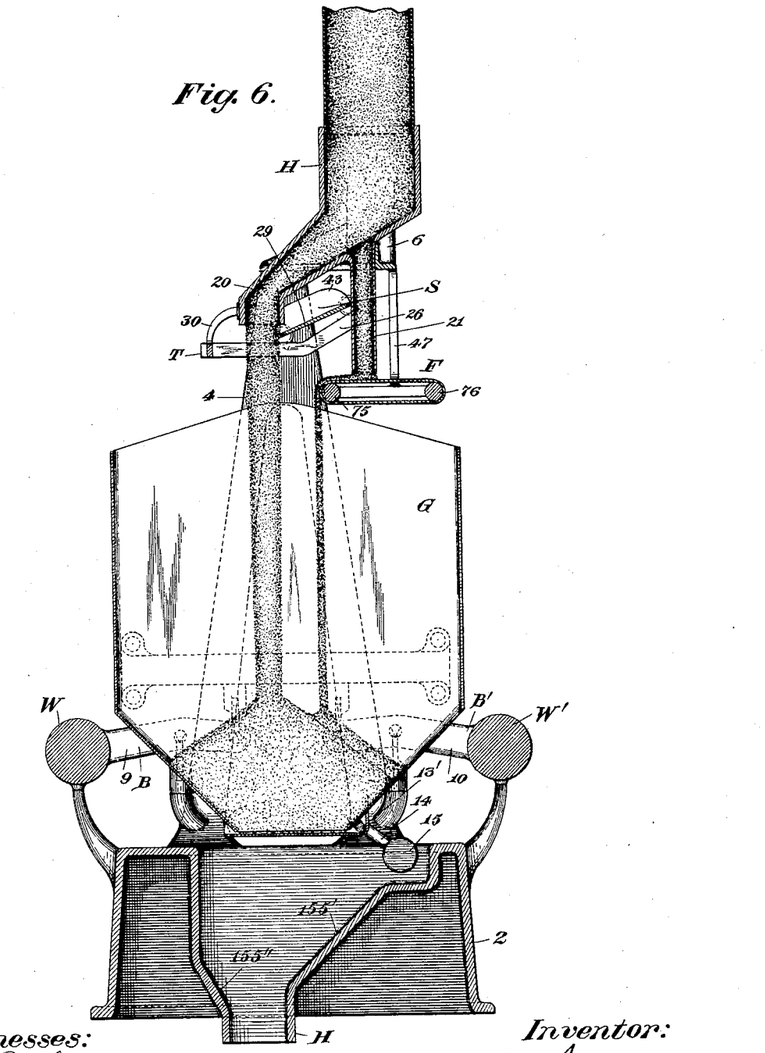
Fig. 6 is a longitudinal central section.

The stream-controller S consists of a suitable carriage adapted to travel bodily between two extreme positions, as indicated, respectively, in Figs. 2 and 5. In the first-mentioned figure the stream-controller S is shown in its open position or retracted, whereby the full volume of the main stream can gravitate into the load-receiver. When the load is nearly completed, the stream-controller will be rapidly advanced by the power-driven mechanism to cut off said main stream, and it will also be retracted by power at the proper stage, thereby relieving the weighing mechanism. The stream-controller or carriage S is supported upon a track, as T, consisting of a pair of rails, as 25 and 26, situated, respectively, at and a short distance beyond the opposite sides of the chute and disposed in two planes, the portions 27 thereof being horizontal or level, while the portions 28 thereof are located at an angle or obliquely to the other portions, and the rear end of the carriage or stream-controller when in its retracted position is supported upon the angular portion of the track, as represented in Fig. 2, whereby the cut-off plate 29 of the stream-controller is disposed at such an inclination as to permit any material thereon to gravitate into the load-receiver. The rear ends of the two rails 25 and 26 are secured to the brackets 5 and 6, while the opposite ends of said rails are joined by the transverse portion 30' to which the supports 30 and 31, fixed to and depending from the front end of the main spout 20, are secured.

The stream-controller or carriage is provided at its front and rear ends, respectively, with the rollers or wheels 40 and 41, adapted to roll on the two rails 25 and 26, and it also has a preferably flat cut-off plate 29 of an area sufficient to arrest the flow of the main stream when said stream-controller is in its advanced position, (indicated in Fig. 5,) and it has vertical flanges or upturned sides, as 43, at its opposite sides, to prevent the lateral flow or escape of material into the loaded load-receiver.

The stream-controller is preferably advanced and retracted alternately at the commencement and near the close, respectively, of a weighing operation, by power-driven mechanism of suitable nature, such as the worms 45 and 46, respectively, the shafts of which are carried by hangers 47 and 48, respectively, depending from the beam 7, a suitable device coöperative and connected, preferably, with the stream-controller being thrown into or out of engagement with the two worms to move the cut-off plate 29 from its open to its closed position, and vice versa.

The connecting device between the stream-controller and the two screws consists of a longitudinal bar 50, loosely embracing the axle 51 of the forward wheels of the stream-controller, the free end of the rod having an inwardly-extending pin 52, adapted to be engaged by the threads of the worms to effect the operation of the stream-controller, the worm 45 serving to advance said stream-controller while the oppositely-rotative worm 46 retracts or opens said stream-controller.

The worm or screw 45 is carried by the section 55 of the two-part shaft S', the other section of the shaft being designated by 56, and said shaft-sections are thrown alternately into operative relation with a driver, as D, fixed to a longitudinally-reciprocative spindle 57, supported by bearings between the shaft-sections 55 and 56, respectively.

The driver may be of any suitable construction, it consisting, in the present case, of a pulley connected by the belt 58 with a second pulley 59 on the normally continuously driven shaft 60, having a main driver, such as a pulley 61, at its end, and the direction of movement of the parts is indicated by the arrows in Fig. 2.

The shaft-sections 55 and 56 carry at their inner ends the clutch members 65 and 66, adapted to coöperate with corresponding clutch members 67 and 68, respectively, the adjacent ends of which are on the reciprocatory spindle 57. When the clutch members 65 and 67 are connected as indicated in Fig. 2, the worm 45 will be operated so as to close the stream-controller S, and the worm or screw 45 will rotate in a direction opposite to that of the worm 46 to open the stream-controller at proper stages, and this reversal of motion may be effected through the meshing gears 70 and 71, secured, respectively, to the shaft-section 55 and to the upper worm-shaft 46′.

It will be remembered that the supply apparatus includes main and auxiliary spouts, the outlet of the main spout being controlled by the stream-controller S, while the supply of the drip-stream from the auxiliary spout is regulated by a force-feeder (designated by F) preferably driven from the worm 45. The force-feeder F consists, preferably, of an endless belt carried by rolls, as 75 and 76, supported by the framework, the direction of motion of the effective portion or upper run of the belt being indicated by the arrow in Fig. 2, and the shaft of the feeder is provided with a worm-gear 77, meshing with the worm 45.

It will be evident that when power is applied to the shaft-section 55 in the manner hereinbefore set forth the upper run of the endless belt or feeder F will be driven forward, so as to force a body of material issuing from the spout 21 into the load-receiver. On the completion of the load the clutch member 67 is disengaged from its companion, thereby stopping the feeder, and consequently the drip-supply.

The connecting-rod 50 is held out of engagement with the stream-controller-advancing screw 45 by means preferably controlled by the weighing mechanism, such means consisting in the present case of a stop C, connected with the lever 80, pivoted to the projection 81 on the upright 3.

The stop C consists, preferably, of two levers, a main or supporting lever, as 82, pivoted to the track 25, and an auxiliary lever, as 83, pivoted near the free end of the supporting-lever. The auxiliary lever 83 is of the nature of a yieldingly-mounted device, for a reason which will be apparent, it being counterweighted, as at 84, and the counterweighted arm is adapted to rest upon the pin or stop 85 upon the main lever, and said counterweighted lever has a laterally-extending pin 86 at its free end, adapted to engage and hold the coupling-rod 50.

The levers 80 and 82 are connected by the link 88, pivoted to the upper lever and bifurcated at its lower end, the bifurcation straddling the pin 89 at the free end of the lever 80, resting upon a stop 90 near the upper end of the load-receiver.

In Fig. 2 the load-receiver G is illustrated in its uppermost position, the pin 52 on the coupling-rod 50 being above the advancing screw 45 and both streams being shown entering the load-receiver. When a certain proportion of the load has been received, the load-receiver will descend, the pin 90 moving away from the gravity-lever 80, thereby permitting it, and consequently the link 88 and stop C, to fall, and as the free end of said stop moves downward the inner end of the coupling-rod can move toward the screw 45, it reaching said screw at the commencement of the poising period, at which time the thread of the screw at its inner or right end will engage the projection 52, and thereby rapidly force the rod 50 to the left for pushing the stream-controller S under the outlet of the main spout 20. When the empty load-receiver rises, the stop C will be lifted, thereby raising the connecting-rod 50 and moving the projection 52 thereof into position to be engaged by the worm 46, which, it will be remembered, rotates in a direction reverse to that of the worm 45 to cause the opening or retraction of the valve. The movement of the coupling-rod 50 is limited by the bars 95 and 96, respectively extending rearward from the hanger 47, and the gravitative movement of the stream-controller S is prevented by a by-pass pawl 98, pivoted to the leaving end of the stream-controller-retracting worm 46 and constituting part of the thread thereof, the pin 52 striking and passing the pawl until the pin reaches its extreme rear position, (shown in Fig. 2,) and when the worm rotates the by-pass pawl will strike the pin to force the same to its first position.

The spindle 57, which carries the clutch members 67 and 68 and the driver D, is operated by a shipper device, as the lever 100, fulcrumed to the framework of the machine and connected with the actuator A, consisting of a lever pivoted, as at 101′, to the projection 101 on the upright 3, the upper arm 102 of the actuator-lever being connected by the link 103 with the lower end of the shipper-lever 100, jointed at its upper end in some ordinary manner with the reciprocatory spindle 57.

The horizontal arm 105 of the actuator-lever A is provided with a weight 106, serving as the power for operating the shipper-lever 100 to move the clutch member 67 out of engagement with the clutch member 65, thereby to stop the operation of the feeder F; but this action of the actuator is controlled by the weighing mechanism, as through the latch 107, pivoted at 108 on the load-receiver and having the beveled offset 108', adapted to engage the lower arm of the actuator, the parts being held in engagement normally by the weight 110 at the free end of the latch, which rests on the pin 112 on the load-receiver.

The actuator A is supported on the framework, while the holding-latch 107 thereof is carried by the load-receiver, and the parts are so mounted relatively to each other that when the load is completed the beveled offset or detent 108' of the latch 107 will pass out of engagement with the actuator A, thereby releasing the same, so that the weight 106 drops, which results in drawing the link 103 to the left and moving the clutch member 67 out of engagement with the clutch member 65. The means for resetting the actuator A is also controlled by the weighing mechanism and will be hereinafter described.

The latch L' is tripped by means connected with and operated from the shaft-section 56, which is coupled with the rotating spindle 57 on the completion of a load, thereby throwing the feeder F out of action and starting the said shaft-section 56 to furnish the necessary power for effecting the discharge of the load, which power is sometimes furnished by the weighing mechanism.

The shaft-section 56 carries a pulley 120, connected by the belt 121 with a pulley 122 on the stub-shaft 123, carried by bearings on the standard 8.

The shaft 123 carries at its inner end a bevel-gear 124, meshing with a larger bevel-gear 125, supported on the standard and having a series of peripheral teeth adapted to mesh with a corresponding number of teeth on a mutilated gear, as 126, connected with the latch-tripper of the machine, the shaft 127 of said mutilated gear being carried by a support on the standard 8, it being also apparent that the gear 125 is in the nature of a bevel-gear, and that when the plain faces of these two parts are in contact the gear 126 will not be turned. When the teeth of the two gears are thrown into mesh, the latch-tripper P will be operated to raise the closer-latch out of engagement with the segment 12, so that the closer can be forced open by the weight of the load in the load-receiver G.

The latch-tripper P consists, preferably, of a longitudinal link pivoted at 130 to the crank-arm 131 on the gear-shaft 127, the opposite end thereof having a longitudinal loop 132, embracing the pin 133 on the free arm of the latch L', so that when the latch-tripper P is pulled down the working arm of the latch will be elevated to disengage it from the segment 12.

The gear 125 at a point near the entering end of its peripheral teeth 135 is provided with a projection 136, adapted to strike the pin 138 on the gear 126, so as to slightly turn said gear, whereby its teeth can be engaged by the teeth of the larger gear, it being understood that the plain faces of the two gears are normally contiguous, as shown in Fig. 2.

When the load is nearly completed, the stream-controller S will be forced under the outlet of the main spout 20, thereby cutting off the main stream, although the passage of the drip-stream into the load-receiver continues, it being forced into said load-receiver by the operation of the feeder F.

Figure 3:
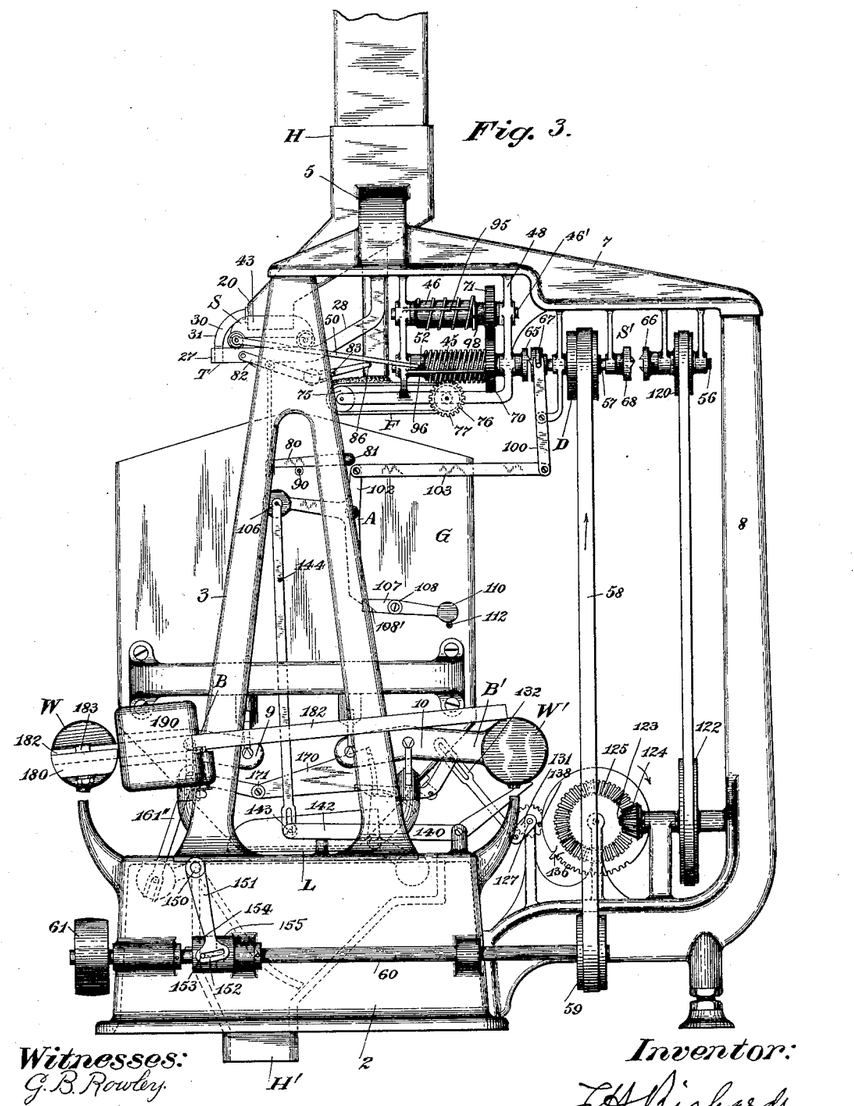

On the completion of the load the offset 108' of the latch 107 will pass out of contact with the actuator-lever A, thereby permitting the weight 106 of said lever to drop, and consequently drawing the link 103 to the left, which throws the clutch member 67 out of engagement with the clutch member 65 for stopping the feeder F and throws the clutch member 68 into engagement with the clutch member 66 on the shaft-section 56, thereby rotating said shaft-section, the pulley 120, and consequently the pulley 122, through the belt 121, and hence the bevel-gear 125, which rotates in the direction of the arrow indicated in Fig. 3. As the large bevel-gear rotates the projection 136 thereof will strike the pin 138 on the small gear 126, thereby slightly turning the gear to bring the teeth thereof into position to be engaged by the coöperating teeth on the large gear, whereby the latter can rotate the small gear for pulling the latch-tripper down to disengage the latch L' and the segment 12. After the latch is tripped the gear will continue to rotate until the small gear reaches its primary position, (shown in Fig. 2,) so that the same operation can be subsequently repeated, and after the parts have returned to said primary positions the load will be discharged, and instrumentalities operated by the discharge of the load will be brought into action for stopping the motion of the main shaft 60, and consequently of the latch-tripping mechanism, which derives its motion therefrom.

The clutch member 67 is returned to its primary position into engagement with the member 65 by means operated by the beam mechanism immediately on the discharge of a load; but the operation of the shaft 60 being stopped during this period the feed mechanism cannot be operated, and for thus stopping the shaft a regulator shiftable by the discharge of the load is provided, it serving to operate a clutch on the main shaft 60, as will be hereinafter set forth.

The resetting means for the clutch-actuator A includes a lever, as 140, pivoted, as at 141, upon a bearing on the base 2, the forward arm 142 of said lever having a pin 143 at its end straddled by a bifurcation on the rod 144, connected at its upper end with the actuator-weight 106, while the rear arm 145 of said resetting-lever is engaged by the weight W'.

Figure 4:
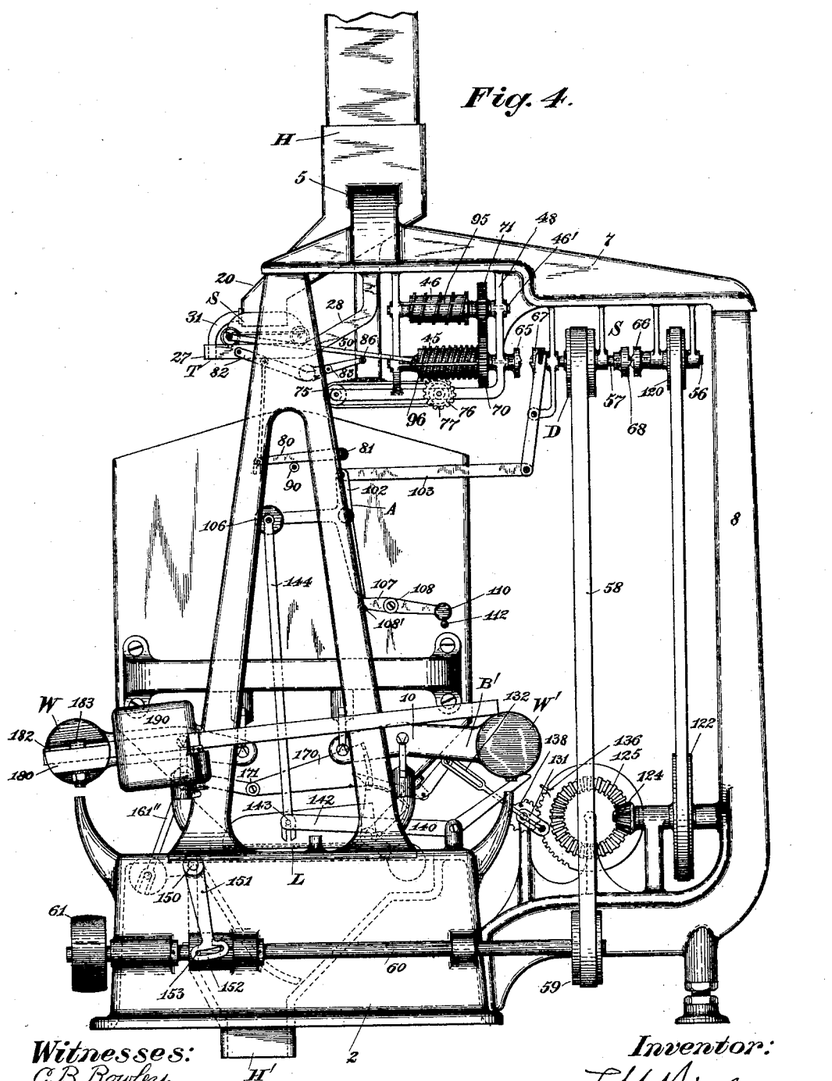

At the commencement of operation the weights W and W' will be in their initial positions, the free arm 145 of the resetting-lever 140 being under and against the weight W' and the clutch members 65 and 67 being in engagement. When a certain proportion of the load is in the load-receiver, the latter will descend, while the weight W' ascends and moves away from the arm 145. On the completion of the load the weight 106 drops, thereby forcing the arm 145 downward and the arm 145' upward against the weight W', as shown in Fig. 4. On the discharge of the load the weight W' drops, thereby tripping the lever 140 and thrusting the rod 144 upward, so that the clutch members 65 and 67 are thrown into engagement; but the movement of the feeder F cannot follow, as at this time the shaft 60 is out of action.

A discharge-hopper, as H', is situated in the base 2, and within said hopper I mount a shiftable regulator, as R, carried by the shaft 150, supported by and one end of which extends through the base of the machine, the extended end of the shaft carrying the clutch-shipper 151, having a loop 152 at its free end embracing the pin 153 on the movable clutch member 154, the fixed clutch member being designated by 155 and being normally in engagement with its companion, whereby on the motion of the pulley 61 the various parts of the machine may be operated in the manner mentioned, the pulley 61 being connected by belting with a suitable motor. (Not shown.)

The regulator R consists, preferably, of a plate the discharge edge of which is adjacent to an inclined wall 155' of the discharge-hopper H', so as to form in connection with said hopper a pocket into which the loads may be intermittently discharged to shift said regulator, whereby the arm 151, and consequently the clutch member 154, can be operated. While the regulator R is in its normal position, the discharge edge thereof is substantially in contact with the inclined wall 155' of the discharge-hopper H', the left hand of the loop 152 being against the pin 153.

On the discharge of the load against the regulator R said regulator will be forced toward the inclined wall 155' of the hopper H', which operation carries the right end of the loop 152 against the pin 153 during the first part of the shifting motion and subsequently moves the clutch member 154 out of engagement with the clutch member 155, as indicated in Fig. 5, thereby to stop the shaft 60 and consequently the other parts of the machine.

The loop 152 at the end of the shipper-arm 151 will permit a certain amount of movement of said shipper-arm on the return stroke of the regulator R without returning the clutch member 154 to engagement with the clutch member 155. When the full stroke, however, is completed, the two parts will be connected, and the clutch members 65 and 67 of the supply apparatus having been previously thrown into engagement the feeder F will be started. When the material has passed from the discharge edge of the regulator R, this is returned to its normal position by the weight 160 on the end of the forwardly-extending arm 161, fixed to the rock-shaft 150.

In connection with the closer and the regulator a pair of interlocking stops are provided, each serving to block the action of the other, by reason of which the sequential operation of the closer and regulator, and consequently of the clutch on the main shaft 60, is assured, and the segment 12, hereinafter described, constitutes one of the two stops, the other stop being designated by 170, pivoted, as at 171, to the hub 172 near the lower forward side of the load-receiver and being provided with the arm 173, weighted, as at 174, the weight serving to hold the stop in its primary position. (Indicated in Figs. 2, 7, and 13.) The stops are provided with oppositely-disposed coöperating flanges or auxiliary stops 12' and 170', respectively, each having a notch or aperture, (designated, respectively, by 175 and 176,) through which the opposing flange can pass, for a purpose that will hereinafter appear, and the flange 12' is of different widths, and the purpose of the wider portion 12" thereof will be hereinafter set forth.

Figure 7:
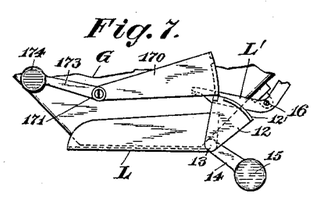
Figs. 7 to 12, inclusive, are detail views showing the action of the interlocking stop mechanism.
Figure 8:
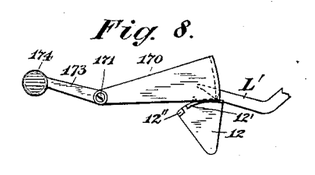
Figure 9:
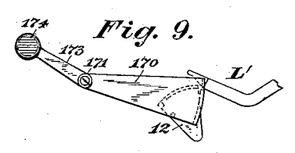
Figure 10:
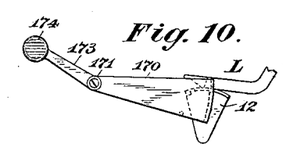
Figure 11:
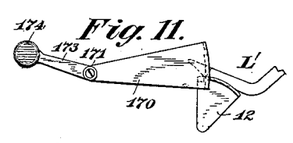
Figure 12:
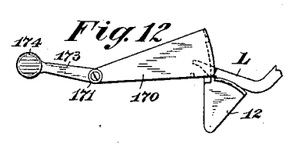

At the commencement of operation the lower end of the stop-flange 170' will be above and substantially in contact with the coöperating flange 12', as represented in Fig. 7, at which stage the latch L' is in engagement with the stop or segment 12, and the flange 12' prevents the downward movement of the flange 170', and consequently of the stop 170. When the latch L' is disengaged from the segment 12, the closer is free to open, and as it does so the stop 12 is swung under the flange 170', and at the same time the load is discharged into the hopper H' and against the regulator R; but the flange 12' prevents the movement of the stop 170' until these two parts have passed out of contact, as represented in Fig. 9, at which time there is contained in the space between the regulator R and the chute-wall 155' a sufficient body of material to promptly shift said regulator, thereby to throw the clutch member 154 instantly out of engagement with the clutch member 155 through the agency of the intermediate devices, and as the regulator is shifted it throws the stop 170 downward through the following mechanism: The operating-weight 161 is provided with a pin 161', embraced by a notch at the lower end of the rod 161", pivoted at its upper end to the weight 174. As the regulator shifts of course the rod 161" is thrust upward, thereby forcing the stop 170 downward and carrying the flange 170' across the arc of oscillation of the flange 12', so as to hold the closer open. When the regulator starts to return to its normal position, the stop 170 is elevated until the aperture 176 is opposite the flange 12' of the closer-stop 12, as shown in Fig. 9, when the counterweight 15 is effective for shutting the closer or until the wide portion 12" of the flange strikes the flange 170, which holds the closer open for a short period of time, and at this point the aperture 175 will have reached a place in line with the flange 170', so that the stop 170 can be returned to its highest position, and as it does it passes out of contact with the stop 12, thereby releasing the latter, and consequently the closer L, whereby the weight 15 can fully shut the closer, the distance traveled by the latter being somewhat slight. When the closer is shut, it is held by the latch L', the hook 17 of which drops into engagement with the inner side of the segment 12.

Figure 14:
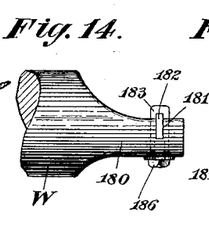
Figs. 14 and 15 are detail views of means employed for mounting an auxiliary beam.
Figure 15:
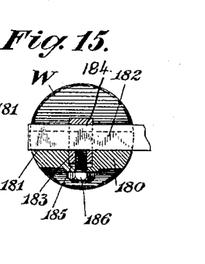

In connection with the main beams B and B', I provide in the machine an auxiliary beam similar in construction and mode of operation to that illustrated in the Letters Patent hereinbefore referred to, and I provide novel means for holding said auxiliary beam on the main beam B. The weight W of said main beam (see Fig. 14) has a reduced end 180, in which the transverse notch 181 is formed, serving as a seat for the inner end of the auxiliary beam 182, held in place by the plug 183, having a slot 184, through which the auxiliary beam is passed, and the plug is fitted into the socket 185, formed near the outer end of the beam-weight W and communicating with and transverse to the notch 181. The beam 182 is held in place by the adjusting-screw 186, passing through an opening in the under side of the weight W and in threaded engagement with the plug 183, and by tightening the screw the inner end of the auxiliary beam is caused to bind against the bottom of the notch 181, thereby holding the same in place. To permit of the adjustment of said auxiliary beam, the adjusting-screw 186 is loosened, so that the auxiliary beam can be moved back and forth until it is in the desired position, at which time the screw is tightened. The auxiliary beam is provided with the weight 190, slidable thereon and serving its usual purpose.

The operation of the hereinbefore-described machine, briefly set forth, is as follows: The parts are shown occupying their primary positions in Fig. 2, at which time the closer L is shut and latched by the latch L', the main stream gravitating into the load-receiver from the spout 20 and the drip-stream fed into said load-receiver by the action of the feeder F. When a certain proportion of the load has been received, the load-receiver will descend, during which period the main-stream controller S will be shut in the manner hereinbefore specified to cut off the main supply, the parts at this time being in the positions shown in Fig. 3, where the drip-stream is illustrated as being forced into the nearly-loaded load-receiver by the feeder F. On the completion of the load the latch L' is tripped from the shaft-section 56' in the manner hereinbefore specified, thereby releasing the closer L, which is forced open to discharge the load. On the discharge of the load the closer is shut by the weight 15, and the beams drop to their primary positions, so as to throw the feeder and the stream-controller-operating mechanisms into position to actuate the respective members at the proper time. When the load is discharged, it strikes and shifts the regulator R, which operation disconnects the clutch members 154 and 155, and hence stops the main shaft 60, these parts not being coupled until the entire load has practically passed from the discharge edge of the regulator, at which point the weight 160 returns said regulator to its first position, and during this operation the two clutch members 154 and 155 are coupled thereby to repeat the operation.

Having described my invention, I claim—

1. The combination, with weighing mechanism involving a load-receiver, of a stream-controller; power-actuated mechanism for imparting advancing and retractive movements alternately to said stream-controller; coupling means normally connected with the stream-controller and disconnected from the power-actuated mechanism; and means controlled by the weighing mechanism for intermittently throwing said coupling means into operative connection with the power-actuated mechanism and thereby free to advance or retract said stream-controller.

2. The combination, with weighing mechanism involving a load-receiver, of a stream-controller; continuously-driven power-actuated mechanism operable for imparting advancing and retracting movements alternately to said stream-controller; and means operative with the weighing mechanism for throwing the stream-controller intermittently into and out of working relation with said mechanism.

3. The combination, with weighing mechanism including a load-receiver, of a stream-controller; two oppositely-moving devices; means operative with the weighing mechanism for actuating said oppositely-moving devices; and means for intermittently throwing the stream-controller into operative relation with said oppositely-movable power-driven devices.

4. The combination, with weighing mechanism including a load-receiver, of a stream-controller; two reversely-rotative and independent power-actuated devices; and means operative with the weighing mechanism for alternately throwing the stream-controller into operative relation with said power-actuated devices.

5. The combination, with weighing mechanism involving a load-receiver, of stream-supplying means for the load-receiver; a stream-controller; two reversely-operative worms; a member connected with the stream-controller; and means controlled by the weighing mechanism for coupling said member with the worms alternately.

6. The combination, with weighing mechanism involving a load-receiver, of stream-supplying means for the load-receiver; a stream-controller; two rotary power devices constituting stream-controller actuators; a pair of shafts for said power devices; meshing gears mounted, respectively, on said shafts; and means controlled by the weighing mechanism for operating one of the shafts.

7. The combination, with weighing mechanism involving a load-receiver, of stream-supplying means for the load-receiver; a stream-controller; two reversely-operative power devices constituting stream-controller actuators; load-discharging means; a rod connected with the stream-controller; means for connecting said rod with the one of the power devices when the load-receiver is empty, thereby to open the stream-controller, and for subsequently connecting said rod with the other device during the weighing of a load, thereby to close the stream-controller.

8. The combination, with weighing mechanism involving a load-receiver, of stream-supplying means for the load-receiver; a stream-controller; a power-actuated device constituting an actuator for the stream-controller and adapted to be connected with the stream-controller for operating the same; means involving an actuator carried by the framework for throwing said device out of action; and a latch mounted upon the weighing mechanism and adapted normally to hold the actuator against operation.

9. The combination, with weighing mechanism involving a load-receiver, of stream-supplying means for the load-receiver; a stream-controller; a power-actuated device constituting an actuator for and adapted to be connected with the stream-controller for bodily moving the same; means involving a gravitative actuator mounted upon the framework, for throwing said power device out of action; and a latch carried by the load-receiver and adapted to be engaged by, and normally hold, the actuator against operation.

10. The combination, with weighing mechanism involving a load-receiver, of stream-supply means for the load-receiver; a stream-controller; a power-actuated device constituting an actuator for and adapted to be connected with the stream-controller for bodily moving the same; driving means for the power-actuated device, including a clutch; a lever connected with the clutch; a gravitative actuator mounted upon the framework and connected with said lever; and a counterweighted latch carried by the load-receiver and adapted normally to engage said actuator.

11. The combination, with weighing mechanism involving a load-receiver, of stream-supplying means for the load-receiver; a stream-controller; a power-actuated device constituting an actuator for and adapted to be connected with the stream-controller for bodily operating the same; means involving an actuator controlled by the weighing mechanism, for throwing said power-actuated device out of action; and means for resetting said actuator.

12. The combination, with weighing mechanism involving a load-receiver, of stream-supplying means for the load-receiver; a stream-controller; a power-actuated device constituting an actuator for and adapted to be connected with the stream-controller for operating the same; means involving an actuator carried by the framework, for throwing the said device out of action; a latch mounted upon the weighing mechanism and adapted normally to hold the actuator against operation; and means operated by the weighing mechanism for resetting said actuator.

13. The combination, with weighing mechanism involving a load-receiver, of stream-supplying means for the load-receiver; a stream-controller; a power-actuated device constituting an actuator for and adapted to be connected with the stream-controller for bodily operating the same; means involving an actuator carried by the framework, for throwing said actuator out of action; a latch mounted on the weighing mechanism for normally holding said actuator against operation; and a lever connected with the actuator and in position to be operated by the weighing mechanism to return the actuator to its normal position to be engaged by said latch.

14. The combination, with weighing mechanism involving a load-receiver, of a supply apparatus; a stream-controller; power-actuated mechanism for operating said stream-controller; means for throwing said power-actuated mechanism into operative relation with the stream-controller; and a force-feed device operated by said power-driven mechanism.

15. The combination, with weighing mechanism involving a load-receiver, of a supply apparatus; a stream-controller; power-actuated mechanism for imparting advancing and retracting movements alternately to said stream-controller; means for throwing said stream-controller into operative relation with said power-actuated mechanism; and a force-feed device operated by the power-driven mechanism.

16. The combination, with weighing mechanism involving a load-receiver, of a supply apparatus; a stream-controller; two power-driven devices mounted to impart opposite movements, respectively, to the stream-controller; means for alternately connecting the stream-controller and power devices; means for throwing said stream-controller into operative relation with said power-actuated mechanism; and a force-feeder operated by one of said power-driven devices.

17. The combination, with weighing mechanism involving a load-receiver, of a chute having main and auxiliary spouts; a stream-controller for the main spout; a feeder adapted to force a drip-stream into the load-receiver; power-driven mechanism for operating the force-feeder; and means for connecting the stream-controller with the power mechanism to advance and retract the same alternately.

18. The combination, with weighing mechanism involving a load-receiver, of a chute having main and auxiliary spouts; a stream-controller for the main spout; a force-feeder situated adjacent to the auxiliary spout; a pair of worms for oppositely rotating said stream-controller; a gear operative with the feeder and meshing with one of the worms; a rod operative with the stream-controller; and means for coupling the rod with the worms alternately.

19. The combination, with stream-supplying means, of a carriage adapted bodily to move between two positions and having a cut-off; continuously-operative power-driven means constructed to operate said carriage in opposite directions; and means for intermittingly coupling the carriage with said power-driven mechanism.

20. The combination, with stream-supplying means, of a carriage having a stream cut-off; a track upon which the carriage is mounted and disposed in two different planes; power-driven mechanism; and means for throwing the carriage into operative relation with said power-driven mechanism.

21. The combination, with stream-supplying means, of a carriage having a stream cut-off; a track upon which said carriage is mounted and consisting of two independent rails; power-driven mechanism; and means for intermittently throwing the carriage into operative relation with said power-driven mechanism.

22. The combination, with stream-supplying means, of a carriage having a stream cut-off; a track upon which the carriage is mounted, part of said track being horizontal and the remainder being disposed at an angle thereto, and said track consisting of two independent rails; and means independent of the stream-controller for moving the same back and forth on the track.

23. The combination, with stream-supplying means, of a carriage provided with a stream cut-off; a track consisting of two parallel rails upon which said carriage is adapted to run; independent power-driven devices, serving, respectively, to advance and retract said carriage; and means for throwing said carriage into operative relation alternately with said power-driven devices.

24. The combination, with weighing mechanism including a load-receiver, of stream-supplying means; a carriage having a stream cut-off; a track upon which the carriage is adapted to run; power-driven mechanism adapted to alternately advance and retract the carriage; and means controlled by the weighing mechanism for intermittently throwing the carriage into operative relation with said power-driven mechanism.

25. The combination, with stream-supplying means, of a carriage having rolls mounted on axles and provided with a stream cut-off; a track upon which the rolls are adapted to run; a rod; a power-actuated device constituting a stream-controller actuator; and means for connecting said rod and power-actuated device.

26. The combination, with weighing mechanism, of stream-supplying means; a stream-controller; a power-actuated device constituting a stream-controller actuator; a connecting-rod adapted to be coupled with said power-actuated device; and a stop for normally holding the connecting-rod out of engagement with the power-actuated device.

27. The combination, with weighing mechanism, of stream-supplying means; a stream-controller; a power-actuated device constituting a stream-controller actuator; a connecting-rod operative with the stream-controller and adapted to be coupled with said power-actuated device; a stop serving normally to hold the connecting-rod out of engagement with the power-actuated device; and means operative with the weighing mechanism for controlling said stop.

28. The combination, with weighing mechanism, of stream-supplying means; a stream-controller; a power-actuated device constituting a stream-controller actuator; a rod connected with the stream-controller and adapted to be coupled with said power-actuated device; a stop engaging the rod; a lever on the framework, connected with the stop; and means carried by the weighing mechanism and engaging said lever.

29. The combination, with weighing mechanism, of stream-supplying means; a stream-controller; a power-actuated device constituting a stream-controller actuator; a rod connected with the stream-controller and adapted to be coupled to said power-actuated device; a pair of levers one of which supports the other and is carried by the framework, the supporting-lever being counterweighted and in position to engage said rod; a third lever mounted on the framework and connected with the supporting-lever; and a stop mounted on the weighing mechanism for engaging said third lever.

30. The combination, with weighing mechanism, of stream-supplying means; a stream-controller; power-actuated means; a rod adapted to be coupled with the power-actuated means; rod-controlling means operative with the weighing mechanism; and bars carried by the framework for limiting the movement of said rod 31. The combination, with weighing mechanism including a load-receiver, of a stream-controller mounted to move bodily between two extreme positions; a power-actuated device; means for connecting the stream-controller and the power-actuated device; a driver for operating the power-actuated device; means for throwing the power-actuated device into and out of operative relation with the driver; a regulator shiftable by the load discharged; and means operative with the regulator for stopping and starting said driver.

32. The combination, with weighing mechanism including a load-receiver, of a stream-controller mounted to move bodily between two extreme positions; a power-actuated device; means for connecting the stream-controller and the power-actuated device; a pulley in position to operate the power-actuated device; and means for throwing the latter into and out of operative relation with the pulley; a shaft provided, respectively, with a main driver and with a pulley connected with the first-mentioned pulley, a regulator shiftable by the load discharged; and means operative with the regulator for stopping and starting said shaft.

33. The combination, with weighing mechanism including a load-receiver, of a stream-controller mounted to move bodily between two extreme positions; a power-actuated device; means for connecting the stream-controller and the power-actuated device; a driver for operating the latter; means for throwing the power-actuated device into and out of operative relation with the driver and shaft; means connecting said shaft and driver; a regulator shiftable by the load; a shaft for carrying said regulator and provided with a device for stopping and starting said shaft.

34. The combination, with weighing mechanism including a load-receiver, of a stream-controller mounted to move bodily between two extreme positions; a power-actuated device; means for connecting the stream-controller and power-actuated device; a driver for operating the latter; means for throwing the power-actuated device into and out of operative relation with the driver; a regulator shiftable by the load discharged; a shaft carrying a clutch and connected with the driver; a second shaft for supporting the regulator, and provided, respectively, with a regulator-returning device and with a clutch-operating arm.

35. The combination, with weighing mechanism including a load-receiver provided with a closer, of a stream-controller; a regulator shiftable by the load discharged; and reciprocally-effective stops operative, respectively, with the closer and regulator, and each having a recessed flange.

36. The combination, with weighing mechanism including a load-receiver provided with a closer, of a regulator shiftable by the load discharged, and reciprocally-effective stops provided with coöperative flanges, each flange being recessed and one of them having a part wider than the remainder.

37. The combination, with weighing mechanism including a load-receiver provided with a closer, of a regulator shiftable by the load discharged from the load-receiver, and reciprocally-effective stops mounted on the load-receiver and connected, respectively, with the closer and with the regulator, each of the stops having apertured flanges, and a portion of one of the flanges being wider than the remainder thereof.

38. The combination, with weighing mechanism and with load-discharger-controlling means therefor involving a latch, of a supply apparatus including a feeder; a shaft in two sections one of which drives the feeder; latch-tripping means operated by the other shaft-section; driving mechanism; and means for connecting the shaft-sections alternately with the driving mechanism.

39. The combination, with weighing mechanism including a load-receiver, of a regulator; a supply apparatus; a bodily-movable stream-controller; a force-feeder; driving mechanism for the stream-controller and force-feeder; means for throwing the driving mechanism into and out of operative relation with the stream-controller and force-feeder; and means operative with the regulator for stopping and starting the driving mechanism.

40. The combination, with weighing mechanism including a load-receiver and with load-discharging means involving a latch, of a power-driven device, and a series of gears operated by the power-driven device and one of them connected with the latch-tripper for operating the latter.

41. The combination, with weighing mechanism including a load-receiver and with load-discharging means involving a latch, of a power-driven device, and a series of gears operated by the power-driven device and one of them connected with the latch-tripper for actuating the latter and one of them being mutilated.

42. The combination, with weighing mechanism including a load-receiver and with load-discharging means involving a latch, of a power-driven device; a series of gears operated by the power-driven device; shafts for supporting said gears, one of the shafts having a crank-arm; and a connection between said crank-arm and the latch.

43. The combination, with weighing mechanism including a load-receiver and with load-discharging means involving a latch, of a power-driven device; a pair of bevel-gears operated by said power-driven device, and one of them having a series of peripheral teeth; a mutilated gear meshing with the peripheral teeth; and connections between said mutilated gear and the latch.

44. The combination, with weighing mechanism including a load-receiver and with load-discharging means involving a latch, of a pair of bevel-gears one of which is provided with a series of teeth on its periphery; a mutilated gear meshing with the peripheral teeth; and connections between the mutilated gear and the latch.

45. The combination, with weighing mechanism including a load-receiver and with load-discharging means involving a latch, of a mutilated gear connected with the latch and provided with a pin, and a device having a series of teeth adapted to engage the teeth of the mutilated gear, and provided with a projection for striking the pin thereon.

46. The combination, with weighing mechanism including a load-receiver and with load-discharging means involving a latch, of a power-driven device; a series of gears operated by the power-driven device; shafts for supporting the gears; a crank-arm fixed to one of the shafts; and a link connected, respectively, with the crank-arm and latch, and having a longitudinal slot at one end.

47. The combination, with weighing mechanism including a load-receiver and with load-discharging means involving a latch, of a power-driven device; a series of gears operated by the power-driven device and connected with the latch for operating the same; a regulator shiftable by the loads discharged; and means operative with the regulator for stopping and starting said power-driven device.

48. The combination, with a load-receiver and with supporting-beams therefor involving a main beam having a notch, of an auxiliary beam seated in said notch; a plug disposed in a socket in the main beam adjacent to the auxiliary beam, and slotted to receive the latter; and adjusting means for engaging said plug.

49. The combination, with a load-receiver and with supporting-beams therefor including a main beam having a notch, of an auxiliary beam seated in said notch; a plug disposed in a socket in the main beam adjacent to the auxiliary beam, and slotted to receive the latter; and an adjusting-screw carried by the main beam and in threaded engagement with said plug.

FRANCIS H. RICHARDS.

Witnesses:
F. N. CHASE,
FRED. J. DOLE.